Patented July 31, 1934

1,968,074

UNITED STATES PATENT OFFICE 1,968,074

PROCESS OF PREPARING RESIN SOLUTIONS

Ernst Elbel and Fritz Seebach, Erkner, near Berlin, Germany, assignors to Bakelite Gesellschaft mit Beschränkter Haftung, Berlin, Germany No Drawing. Application November 29, 1930, Serial No. 497,063. In Germany December 4, 1929

3 Claims. (Cl. 134—26)

According to our prior U. S. application Ser. No. 295,344 filed July 25, 1928, lacquers or varnishes can be prepared from resitoles, that is, synthetic resinous products of a hardenable nature, which are in an intermediate or "B" state wherein they are not fusible or soluble but swell in the usual solvents. According to that disclosure lacquers or varnishes are obtained by dissolving resitoles in suitable solvents, either alone or with the addition of other resins, under normal atmosphere, reduced or increased pressure and at ordinary or elevated temperatures.

A further disclosure in our prior U. S. application Ser. No. 422,683 filed January 22, 1930, shows that an improvement is made when lacquers or varnishes which consist of a resitole solution are obtained from resinoids of the A type instead of the B type by dissolving resinoids of the A type or novolaks together with the requisite hardening agents in solvents of the character specified, and then transforming to the B type while in solution.

In the course of further experimentation, it has been found that such solutions of resitoles may be obtained more readily and to better advantage if the initial materials necessary for the formation of the resinoid are reacted in a solvent such as hexalin, which is suitable for resitoles, and the condensation is carried out therein. In this procedure formaldehyde may be used in aqueous solution as well as in solid form, i. e. polymeric aldehydes or substances forming aldehydes, as for example hexamethylenetetramine, etc. It is better to work in the absence of water, since aqueous formaldehyde does not act as well as, for example, paraform or hexamethylenetetramine. If water is present the boiling temperature in the condensing apparatus cannot rise above the boiling point of the water, and the boiling substance is not uniform, but consists of a hydrous and an anhydrous layer. By using paraform or hexamethylenetetramine, only a slight quantity of water develops from the reaction, which therefore may be rapidly expelled.

Phenol or its homologs and poly-valent phenols, as for example cresol, resorcin, dioxydiphenyl-dimethyl-methane, may be used. These may also be mixed with one another. The condensation may for example be carried out by adding proper catalysts to develop a resole directly or a non-hardenable resin or a novolak. The catalyst may be used in the solid, liquid, dissolved, or gaseous state, varying the quantity according to the state used. In working with basic catalysts, the resitole state may be reached in one step. In this case paraform may be used with basic-reacting compounds, as well as with hexamethylenetetramine. In condensing with acid or acid-reacting catalysts, it is preferable to add first paraform only and then hexamethylenetetramine after forming the novolak, in order to convert the novolak into a resole or resitole. Another method is to condense without catalysts or then to add these later or in several stages.

It has been found that better results are obtained with cresol than with phenol, and that this is true in two respects. First, the resitole solutions prepared with cresol according to the present process are perfectly clear, while resitole-resin-solutions obtained from phenol in a perfectly analogous reaction are very cloudy and the resins have a tendency to precipitate from the solution at a definite concentration. Furthermore, the reaction runs more smoothly with cresol than with phenol. This is explained by the fact that resitole-resin solutions made from cresol, according to the present process, contain considerably less uncombined phenolic body than resitole-resin solutions which have been prepared from phenol.

Example 1.—26 grams crystallized phenol and 6.5 grams hexamethylenetetramine are heated in 300 grams hexalin. The temperature rises to 170° C. After some time (30 minutes), 26 grams crystallized phenol and 6.5 grams hexa are again added and condensed for another 30 minutes. Thereupon 26 grams crystallized phenol and 6.5 grams hexa are added for the third time. The final product in a reflected bright light is cloudy, but in a light shining through it is completely clear and represents a colloidal solution of high dispersion.

Example 2.—Procedure is according to the first example with the addition to the same quantity of hexalin, of four times 26 grams of crystallized phenol and four times 6.5 grams hexa. The final product is much more cloudy than the final product of the first example. It is clear and transparent only in a very thin layer and is much more viscous than the final product of Example 1.

Example 3.—In using cresol the following is the procedure—54 grams cresol and 12 grams hexa are added to 300 grams hexalin and condensed for 45 minutes. After this period 54 grams cresol and 12 grams hexa are again added. The total time of condensation is 3 hours. The solution is perfectly clear and very viscous. It is more viscous than the product made in accordance with Example 2.

Example 4.—Procedure is as in Example 3 except that the cresol and hexa are added all at once (108 grams cresol and 24 grams hexa). The mixture is condensed for an hour and 25 minutes on an oil bath. The viscosity is lower than that of the product of Example 3.

If the condensation period is lengthened and heat applied for 2 or 3 hours the solution becomes more viscous, and finally so viscous that further boiling is impossible.

The condensation may be carried out under normal or elevated pressure. Other solvents, plasticizers and fireproofing materials mentioned in the U. S. application Ser. No. 295,344, such as cyclic ketones or the equivalent alcohols, such as cyclohexanol, their homologs and esters, and hydrogenated naphthalenes, may be added to the above-mentioned solutions, either before, during or after condensation.

The following definitions are intended for terms used in the specification and claims. A "resole" or "A type" resin is a resin of the type hardenable by heat to a final infusible and insoluble condition but reacted only to the stage where it still melts when heated and is soluble in acetone; this is also known as the "A stage". A "resitole" or a "B type" resin is a resin of the same type as the resole but further reacted to an intermediate or "B stage" where it has become infusible, i. e., it does not melt though it softens decidedly on heating and is insoluble but swells in acetone. The "Novolak" is a distinctly different type of resinous reaction product in that practically speaking it does not harden upon heating to an insoluble, infusible condition but remains soluble and fusible. The resins here defined are those made from the phenols or their homologs and derivatives with a methylene or aldehyde agent as is well understood by those skilled in the art.

We claim:

1. Process of preparing a solution of a resinous phenol-aldehyde condensation product which is thermoplastic but infusible and which is insoluble in alcohol but swells therein from a phenol and a reactive methylene body which comprises reacting the initial resin ingredients in the presence of a solvent selected from the group consisting of hydrogenated aromatic hydrocarbons, hexahydrogenated phenols and their esters and hydroaromatic cyclic ketones, and continuing the reaction to the stage at which the resin is thermoplastic but infusible and at which it is insoluble in alcohol but swells therein, sufficient proportion of the methylene body being included to insure the formation of a resin of the latter characteristics.

2. Process of preparing a solution of a resinous phenol-aldehyde condensation product which is thermoplastic but infusible and which is insoluble in alcohol but swells therein from a phenol and a reactive methylene body which comprises condensing a portion of the phenol with a portion of the methylene body in resin forming proportions in the presence of a solvent selected from the group consisting of hydrogenated aromatic hydrocarbons, hexahydrogenated phenols and their esters and hydroaromatic cyclic ketones, thereupon adding further portions of the phenol and the methylene body, and continuing the reaction to the stage at which the resin is thermoplastic but infusible and at which it is insoluble in alcohol but swells therein.

3. As a composition of matter a solution of a phenol-formaldehyde resin in an organic solvent of the group consisting of hydrogenated aromatic hydrocarbons, hexahydrogenated phenols and their esters and hydroaromatic cyclic ketones, which composition is prepared by reacting a phenol and a reactive methylene body in the presence of the said solvent, and continuing the resinification of the phenol resin thus produced to a stage at which the said resin is thermoplastic but infusible and at which it is insoluble in alcohol but swells therein, a sufficient proportion of the methylene body having been included to insure the formation of the said infusible product.

ERNST ELBEL.
FRITZ SEEBACH.